United States Patent [19]

Nishikawa

[11] Patent Number: 4,868,377
[45] Date of Patent: Sep. 19, 1989

[54] OPTICAL PICKUP FOR READING OPTICAL DISK INFORMATION PROVIDED WITH ERROR DETECTING MEANS BY KNIFE EDGE TEST

[75] Inventor: Koichiro Nishikawa, Tokyo, Japan
[73] Assignee: Asahi Optical Co., Ltd., Tokyo, Japan
[21] Appl. No.: 151,548
[22] Filed: Feb. 2, 1988
[30] Foreign Application Priority Data Feb. 4, 1987 [JP] Japan ................................. 62-22562
Feb. 20, 1987 [JP] Japan ................................. 62-37388

[51] Int. Cl.$^4$ ......................... G01J 1/20; G04B 45/00
[52] U.S. Cl. ..................................... 250/201; 369/45
[58] Field of Search ......................... 250/201 DF, 202; 369/44–46

[56] References Cited

U.S. PATENT DOCUMENTS 4,135,207 1/1979 Greve et al. .......................... 369/45
4,143,402 3/1979 Bricot et al. .......................... 369/45
4,345,321 8/1982 Arquie et al. ......................... 369/46
4,485,303 11/1984 Suzuki ................................ 250/201

Primary Examiner—David C. Nelms
Assistant Examiner—Stephone B. Allen
Attorney, Agent, or Firm—Sandler & Greenblum

[57] ABSTRACT

According to an optical system of an optical pickup of the present invention, beam is split into two portions by a light refracting member which is disposed between a condenser lens and a light receiving element, a portion of beam entering into the light refracting member is utilized for detecting tracking errors, and the remaining portion of beam which is not permitted to enter into the light refracting member is utilized for detecting focussing errors by a knife edge test. With the above-mentioned constitution of the optical system, a tracking error composition is prevented from interferring with the focussing error detection and, at the same time, both the tracking errors and focussing errors can be detected by one light receiving element. Thus, the number of component parts can be reduced and the optical system itself can be made compact.

33 Claims, 4 Drawing Sheets

OPTICAL PICKUP FOR READING OPTICAL DISK INFORMATION PROVIDED WITH ERROR DETECTING MEANS BY KNIFE EDGE TEST

BACKGROUND OF THE INVENTION

This invention relates to an improvement of an optical pickup for detecting focussing errors by a knife edge test.

A conventional optical system of an optical pickup of is illustrated in FIG. 5.

As is shown in FIG. 5, optical system A includes a laser beam element 1 for emitting a beam, a collimate lens 2 for making the beam in parallel pencil rays, a polarizing beam splitter 3, a quarter wavelength plate 4, an objective lens 5 for forming a spot on an optical disk D, a condenser lens 6 for converging a reflected beam, a light receiving element 7 for detecting focussing errors, a knife edge 8 disposed between the condenser lens 6 and the light receiving element 7 for detecting focussing errors to block generally a half portion of the beam in order to detect focussing errors by a knife edge test, and a half mirror prism 10 that is disposed between the knife edge 8 and condenser lens 6 so as to radiate a portion of the reflected beam to a light receiving element 9 for detecting tracking errors.

In the optical system A having the above-mentioned constitution, the beam emitted by the laser beam 1 and reflected by the optical disk D is converged toward the light receiving element 7 for detecting focussing errors by the condenser lens 6 and then split into two portions by the half mirror prism 10.

The beam passed through the half mirror prism 10 is blocked generally a half portion thereof by the knife edge 8. The remaining portion of the beam, which is not blocked by the knife edge 8, radiates the light receiving element 7 for detecting focussing errors. On the other hand, the beam reflected by the half mirror prism 10 is permitted to directly radiate the light receiving element 9 for detecting tracking errors. Each of the light receiving elements 7 and 9 outputs an error signal depending on the light receiving state thereof.

The light receiving element 7 for detecting focussing errors, as shown in FIG. 7, is a two-division element which is disposed in a converging position of the reflected beam during the focussing time of the objective lens 5.

Due to the above-mentioned arrangement, the reflected beam radiates an upper light receiving area 7a, as shown in FIG. 6, when the distance between the optical disk D and the objective lens 5 is too near, whereas it radiates a lower light receiving area 7b, as shown in FIG. 7, when the distance is too far. When focussing, the reflected beam is converged between the upper and lower light receiving areas as shown in FIG. 8.

However, in such a conventional optical system A of an optical pickup as described above, since the light receiving element for detecting focussing errors and the other light receiving element for detecting tracking errors must be disposed in independent positions and since a half mirror prism or half-transmitting prism is also required, the number of component parts becomes large and the optical system itself becomes bulky.

There is another conventional optical system which aims at solving the above-mentioned problems and attempts to detect both error signals by one light receiving element. One such example is shown in FIG. 9.

In this embodiment, a four-division light receiving element 11 illustrated is employed. A cylindrical lens 12 is disposed between the light receiving element 11 and condenser lens 6, for detecting focussing errors by an astigmatism method.

If an optical system is constructed in a way as mentioned above, it is true that both errors can be simultaneously detected by adding or deducting outputs of various light receiving areas a, b, c, and d of the light receiving element 11 [focussing error equals $(a+d)-(b+c)$, and tracking error equals $(a+c)-(b+d)$]. However, this optical system must be designed such that the beam constantly radiates the light receiving element in order to obtain a tracking error signal and a regenerating signal.

However, since a DRAW (direct read after write) type optical disk is designed such that the tracking error composition by a push-pull method becomes maximum, if the beam radiates the light receiving areas even during the focussing time, there arises another problem in that the tracking error composition contained in the beam interferes with the focussing error signal and, as a result, a correct focussing error detection is difficult to carry out.

SUMMARY OF THE INVENTION

It is therefore an object of the present invention to provide an optical pickup for a compact optical system of an in which tracking error composition contained in the pickup beam is prevented from interferring with a focussing error signal and yet, the number of component parts can be limited.

In order to achieve the above-mentioned object, an optical pickup according to the present invention comprises an objective lens for forming a spot on an optical disk, a condenser lens for converging a beam reflected by the optical disk through the objective lens, a light refracting member for permitting a portion of the beam, i.e., the portion at one side of a beam which is separated by the diameter in the direction corresponding to the widthwise direction of a track as a border, coming from the condenser lens to enter therein, and refracting that portion of the beam so as to separate it from the remaining portion of the beam which is not permitted to enter, a light receiving portion for detecting tracking errors to which the beam passed through the light refracting member radiates, and a light receiving portion for detecting focussing errors to which the beam which was not permitted to enter into said light refracting member radiates.

According to the above-mentioned constitution, a portion the of beam, i.e., the portion of the beam permitted to enter into the light refracting member, reflected by the optical disk and converged by the condenser lens, is refracted by the light refracting member, separated from the remaining portion of the beam which is not permitted to enter therein and converged toward the light receiving portion for detecting tracking errors, whereas the remaining portion of the beam which is not permitted to enter into the light refracting member is directly converged toward the light receiving portion for detecting focussing errors so as to be utilized for detecting focussing errors by a knife edge test.

Other objects and further features of the present invention will become apparent from the following detailed description of a preferred embodiment with reference to the accompanying drawings.

DETAILED DESCRIPTION OF THE INVENTION

The present invention will be described hereinafter with reference to the accompanying drawings.

Figure 1:
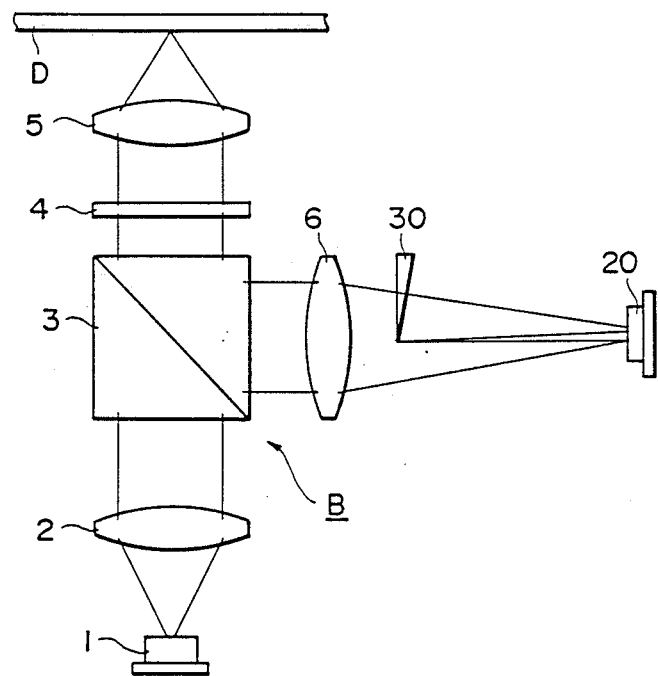
FIG. 1 is a schematic view for explaining a first embodiment of an optical pickup according to the present invention.
Figure 2:
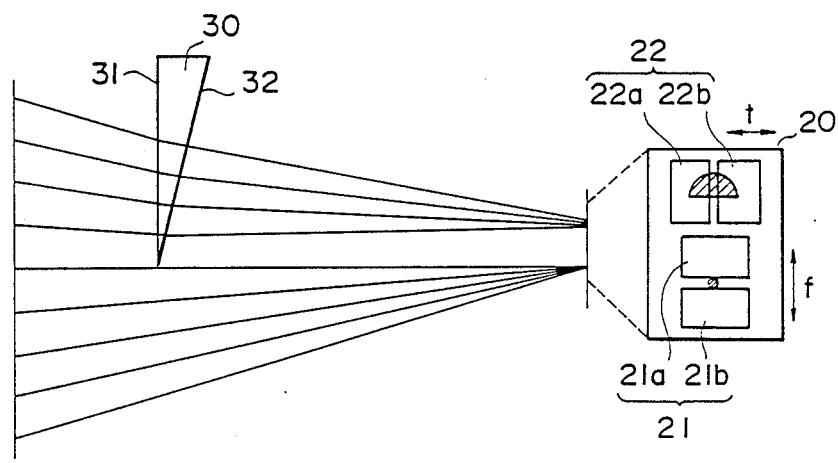
FIG. 2 is a schematic view for explaining an important portion of FIG. 1.

FIGS. 1 and 2 illustrate a first embodiment of the present invention.

As is shown in the figures, an optical system B comprises a laser element 1, a collimate lens 2, a polarizing beam splitter 3, a quarter wavelength plate 4, an objective lens 5, and a condenser lens 6 all of which are known per se. A light receiving element 20 is disposed in a position where the reflected beam is converged at the time when the objective lens 5 is focussed.

The light receiving element 20, as shown in FIG. 2, is provided with a first light receiving portion 21 for detecting focussing errors and a second light receiving portion 22 for detecting tracking errors in vertically parallel relation in the figure. The first light receiving portion 21 for detecting focussing errors comprises a pair of light receiving areas 21a and 21b which are adjacent with each other in a vertically parallel relationship in the figure, whereas the tracking error detecting light receiving portion 22 comprises a pair of light receiving areas 22a and 22b which are adjacent with each other in a horizontally parallel relationship. That is, the arranging direction of the light receiving areas 21a and 21b is perpendicular to the arranging direction of the light receiving areas 22a and 22b. The pair of light receiving areas 21a and 21b are disposed adjacent with each other in a vertical relationship and extended in the horizontal direction, whereas the other pair of light receiving areas 22a and 22b are disposed adjacent with each other in horizontal relation and extended in the vertical direction perpendicular to the direction in which the light receiving elements 21a and 21b are extended.

A wedge-shaped prism 30, acting as a light refracting member, is disposed between the condensing lens 6 and the light receiving element 20 in such a fashion as to generally block a half portion of the beam.

The prism 30 is disposed such that a face 31 of incidence thereof (also known as incident face 31) is disposed normal to the optical axis of the beam. An outgoing face 32 is slanted by a predetermined angle with respect to the incident face 31. The prism 30 is disposed such that a ridge line entering into the beam is generally coincident with the diameter in the direction corresponding to the widthwise direction of the track in the beam, so that it functions as a knife edge in the same manner as the prior art with respect to a portion of the beam coming from the condenser lens 6, i.e., the portion not entering into the prism 30. On the other hand, the prism 30 functions to refract the remaining portion of the beam which is permitted to enter therein and change the optical path for it.

The operation of the optical system B will now be described.

A beam of a linearly polarized light emitted by the laser element 1 is made into a plurality of parallel pencil rays by the collimate lens 2 and permitted to pass through a polarizing beam splitter 3, made into a circularly polarized light by the quarter wavelength plate 4 and passed through the objective lens 5. A spot is formed on the optical disk D the light that passes through by the objective lens 5. At the same time, the beam is reflected by the optical disk D to become a circularly polarized light that rotates in the opposite direction with respect to the incident time, and then made into a linearly polarized light by the quarter wavelength plate 4 perpendicular to that when it enters.

The reflected beam made into the linearly polarized light is reflected by the polarizing beam splitter 3 and permitted to pass through the condenser lens 6. The half portion of the reflected light beam made into the linearly polarized light and not permitted to enter into the prism 30 is directly converged toward the light receiving portion 21 for detecting focussing errors of the light receiving element 20.

The portion of the beam which is permitted to pass through into the prism 30 is refracted when it enters into the prism 30 and when it goes out of the prism 30, and is converged toward the light receiving portion 22 for detecting tracking errors. A converging point of the beam permitted to enter into the prism 30 is situated in a position above a converging point of the beam not permitted to enter therein in the figure.

Figure 6:
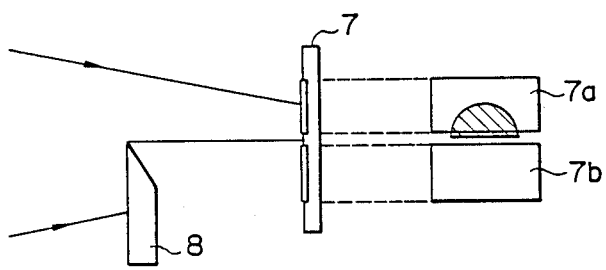
FIGS. 6 through 8 are plan views showing a light receiving state of a light receiving element for focussing errors shown in FIG. 5.
Figure 7:
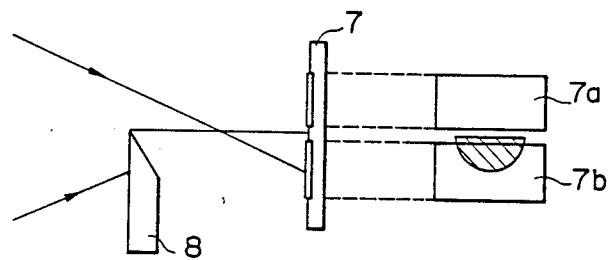
Figure 8:
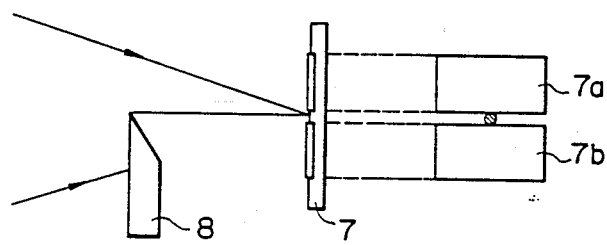
Figure 9:
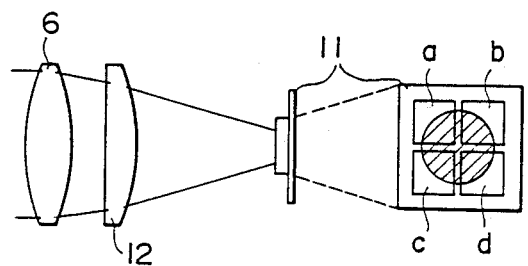
FIG. 9 is a schematic view showing another conventional optical system.

The relationship between the light receiving state of the light receiving element 20 and the distance from the optical disk D to the objective lens 5 is the same as in the prior art, as shown in FIGS. 6 through 8. When the beam forms a spot on the optical disk D in a focussing state, the reflected beam, as shown in FIG. 2, is not permitted to enter into any of the light receiving areas 21a and 21b of the light receiving portion 21 for focussing errors. Therefore, in the foregoing state, the tracking error composition does not interfere with the focussing error signal and correct focussing error detection can be carried out.

On the other hand, when the objective lens 5 is focussed, a semi-circular spot that is larger than the spot formed on the light receiving portion 21 for detecting focussing errors is formed on the light receiving portion 22 for detecting tracking errors of the light receiving element 20, as shown in FIG. 2.

A tracking error signal by a push-pull method can be detected by deducting the output of the light receiving areas 22a and 22b of the light receiving portion 22 for detecting tracking errors.

A regenerating signal can be obtained by adding the output of the light receiving areas 22a and 22b of the light receiving portion 22 for detecting tracking errors.

The distance between the spot for detecting focussing errors and the spot for detecting tracking errors can be selected by suitably establishing the refractive index, thickness, apical angle, etc. of the prism 30.

Figure 3:
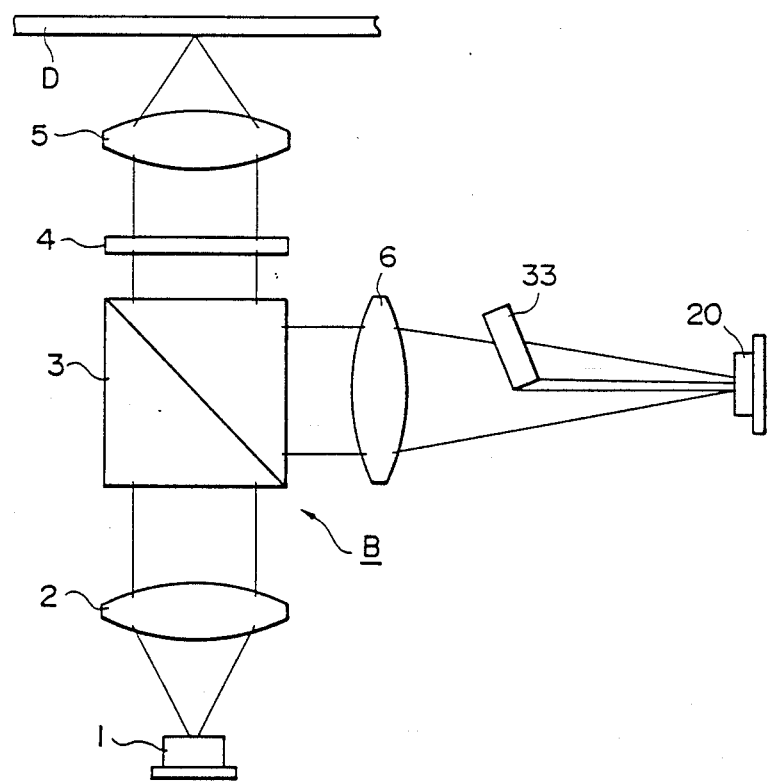
FIG. 3 is a schematic view showing a second embodiment of an optical system of an optical pickup according to the present invention.
Figure 4:
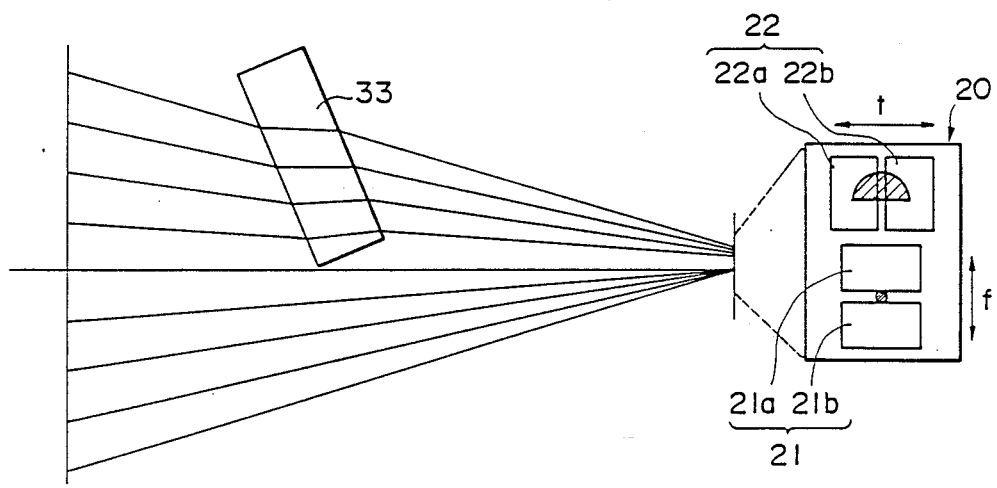
FIG. 4 is a schematic view for explaining an important portion of FIG. 3.
Figure 5:
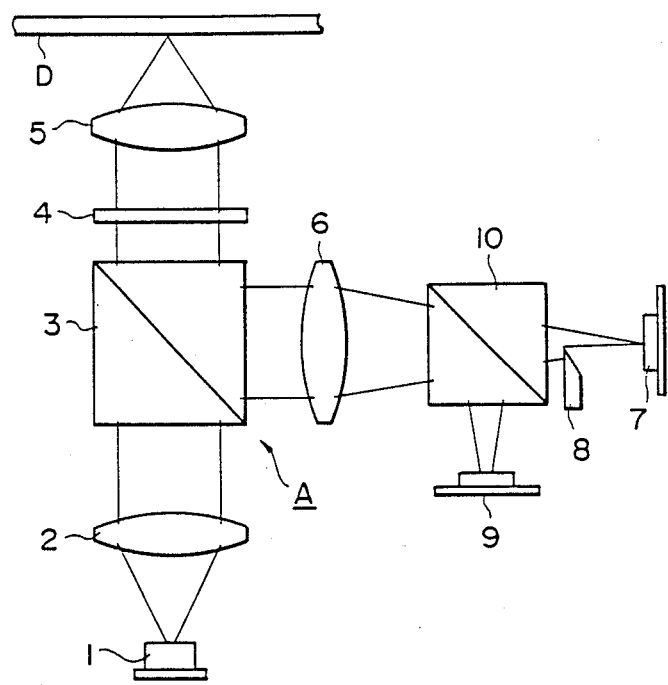
FIG. 5 is a schematic view showing a conventional optical system.

FIGS. 3 and 4 illustrate a second embodiment of the present invention. In this embodiment, the light refracting member, i.e., prism 30 of the first embodiment is replaced with a parallel plane plate 33 with the remaining components being the same as in the first embodiment.

The parallel plane plate 33 is disposed such that a ridge line entering into the beam is generally coincident with the diameter in the direction corresponding to the widthwise direction of the track in the beam, so that it functions as a knife edge in the same manner as the prior art with respect to a portion of the beam coming from the condenser lens 6, i.e., the portion not entering into the parallel plane plate 33. On the other hand, the parallel plane plate 33 has such a function as to change the optical path for the remaining portion of the beam which is not permitted to enter therein. The parallel plane plate 33 is disposed at angles with respect to a plane perpendicular to an optical axis of the beam.

With the above-mentioned construction, in the same manner as the first embodiment, the beam of a linearly polarized light emitted by the laser element 1 is made into a plurality of a parallel pencil rays by the collimate lens 2 and permitted to pass through a polarizing beam splitter 3, then made into a circularly polarized light by the quarter wavelength plate 4 and passed through the objective lens 5. A spot is formed on the optical disk D by the objective lens 5. At the same time, the beam is reflected by the optical disk D to become a circularly polarized light rotating in the opposite direction with respect to that of the incident time, and then made into a linearly polarized light by the quarter wavelength plate 4 perpendicular to that of the incident time.

The reflected beam made into the linearly polarized light is reflected by the polarizing beam splitter 3 and permitted to pass through the condenser lens 6. A generally half portion of the reflected light beam is directly converged toward the light receiving portion 21 for detecting focussing errors of the light receiving element 20.

The remaining portion of the beam which is permitted to enter into the parallel plane plate 33 is refracted when it enters into the parallel plane plate 33 and when it goes out of the parallel plane plate 33, and is converged toward the light receiving portion 22 for detecting tracking errors. A converging point of the beam permitted to enter into the parallel plane plate 33 is situated at an upper right position of that of the beam not permitted to enter therein in the figure.

The relationship between the light receiving state of the light receiving element 20 and the distance from the optical disk D to the objective lens 5 is the same as the prior art as shown in FIGS. 6 through 8. When the beam forms a spot on the optical disk D in a focussing state, the reflected beam, as shown in FIG. 4, is not permitted to enter into any of the light receiving areas 21a and 21b of the light receiving portion 21 for detecting focussing errors. Therefore, in the foregoing state, the tracking error composition does not interfere with the focussing error signal and a correct focussing error detection can be carried out.

On the other hand, when the objective lens 5 is focussed, a semi-circular spot larger than the spot formed on the focussing error detecting light receiving portion 21 is formed on the light receiving portion 22 for detecting tracking errors of the light receiving element 20 as shown in FIG. 4.

A tracking error signal by a push-pull method can be detected by deducting the output of the light receiving areas 22a and 22b of the light receiving portion 22 for detecting tracking errors.

A regenerating signal can be obtained by adding the output of the light receiving areas 22a and 22b of the light receiving portion 22 for detecting tracking errors.

The distance between the spot for detecting focussing errors and the spot for detecting tracking errors can be selected by suitably establishing the refractive index and thickness of the parallel plane plate 33 and the angle formed by the parallel plane plate 33 and a plane perpendicular to the optical axis.

By constituting the optical system in the way as described in the first and second embodiments, adjusting direction f of the light receiving element 20 coincides with the extending direction of the light receiving areas 22a, 22b of the receiving portion 22 for detecting tracking errors, whereas the adjusting direction t of the light receiving element 20 coincides with the extending direction of the light receiving areas 21a, 21b of the receiving portin 21 for detecting focussing errors. Since the extending direction of the light receiving areas 21a, 21b is perpendicular to the extending direction of the light receiving areas 22a, 22b, said adjusting direction f is perpendicular to the adjusting direction t. Therefore, even if the light receiving element 20 is moved for adjusting in the adjusting direction f, it does not affect the light receiving state on the light receiving areas 22a, 22b, and even if the light receiving element 20 is moved for adjusting in the adjusting direction t, it does not affect the light receiving state on the light receiving areas 21a, 21b, either.

In the above-mentioned first and second embodiments, two light receiving portions are provided for one light receiving element. However, the present invention is not limited to this. A light receiving portion may be provided for separated light receiving elements, respectively and two light receiving elements may be used. Even in that case, two light receiving elements can be disposed in parallel relation and a half mirror is not required to provide. Therefore, the optical system according to the present invention can be made more compact than that of the conventional optical system of an optical pickup.

As described in the foregoing, according to the present invention, a beam is split into two portions by a light refracting member such as, for example, a wedge-shaped prism or a parallel plane plate disposed between a condenser lens and a light receiving portion, and a portion of the beam entering into the light refracting member is utilized for detecting tracking errors, whereas the remaining portion of the beam which is not permitted to enter into the light refracting member is utilized for detecting focussing errors by a knife edge test. Therefore, the tracking error composition is prevented from interferring with the focussing error detection and both of the tracking errors and focussing errors can be detected by one light receiving element. Thus, the number of the component parts can be reduced and the optical system itself can be made compact.

What is claimed is:

1. An optical pickup for an optical system, comprising:
    (a) an objective lens for receiving a light source and forming a spot on an optical disk;

(b) a condenser lens for converging a light beam that is reflected by said optical disk;

(c) a light refracting member for permitting a portion of said light beam coming from said condenser lens to enter therein, refracting said portion of said light beam so as to separate it from the remaining portion of said light beam which is not permitted to enter said light refracting member;

(d) a light receiving portion for receiving said light beam that passed through said light refracting member for detecting tracking errors in said optical system; and (e) a light receiving portion for receiving said light beam which did not enter said light refracting member for detecting focussing errors in said optical system radiates.

2. The optical pickup of claim 1, wherein said light receiving portion for detecting tracking errors and said light receiving portion for detecting focussing errors are each provided with a pair of light receiving areas, said light receiving portion for detecting tracking errors being positioned substantially perpendicular to said light receiving portion for detecting focussing errors.

3. The optical pickup of claim 1, wherein said light refracting member comprises a parallel plane plate that is disposed at an angle with respect to a plane that is substantially perpendicular to an optical axis of said light beam.

4. The optical pickup of claim 1, wherein said light refracting member comprises a wedge-shaped prism.

5. The optical pickup of claim 3, wherein said light receiving portion for detecting tracking errors and said light receiving portion for detecting focussing errors are each provided with a pair of light receiving areas, said light receiving portion for detecting tracking errors being positioned substantially perpendicular to said light receiving portion for detecting focussing errors.

6. The optical pickup of claim 4, wherein said light receiving portion for detecting tracking errors and said light receiving portion for detecting focussing errors are each provided with a pair of light receiving areas, said light receiving portion for detecting tracking errors being positioned substantially perpendicular to said light receiving area of said light receiving portion for detecting focussing errors.

7. An optical pickup for an optical system, comprising:

(a) an objective lens for receiving a light source to form a spot on an optical disk;

(b) a condenser lens for converging a light beam that is reflected by said optical disk;

(c) a wedge-shaped prism for permitting a portion of said beam coming from said condenser lens to enter therein, refracting said portion of said light beam so as to separate it from the remaining portion of said light beam which does not enter said light refracting member;

(d) a first light receiving portion for receiving said light beam, comprising a first pair of light receiving areas for detecting tracking errors in response to said light beam impinging said first pair of light receiving areas after said light beam has passed through said prism; and (e) a second light receiving portion for receiving said light beam, comprising a second pair of light receiving areas, said second pair of light receiving areas being positioned substantially perpendicular to the direction of said first pair of light receiving areas for detecting focussing errors, and wherein said light beam that impinges upon said second pair of light receiving areas does not enter said prism.

8. An optical pickup for an optical system, comprising:

(a) an objective lens for receiving a light source and forming a spot on an optical disk;

(b) a condenser lens for converging a light beam reflected by said optical disk;

(c) a parallel plane plate for permitting a portion of said light beam coming from said condenser lens to enter therein, refracting said portion of said light beam so as to separate it from the remaining portion of said light beam which is not permitted to enter said parallel plane plate;

(d) a first light receiving portion for receiving said light beam, comprising a first pair of light receiving areas for detecting tracking errors in response to said light beam impinging said first pair of light receiving areas after said light beam has passed through said parallel plane plate; and (e) a second light receiving portion for receiving said light beam, comprising a second pair of light receiving areas, said second pair of light receiving areas being positioned substantially perpendicular to the direction of said first pair of light receiving areas for detecting focussing errors, and wherein said light beam that impinges upon said second pair of light receiving areas does not enter said parallel plane plate.

9. An optical pickup for an optical system, comprising:

(a) means for creating a light beam;

(b) a collimate lens that receives said light beam for making a plurality of parallel light beam rays;

(c) a beam splitter through which said parallel light beam rays from said collimate lens pass;

(d) a quarter wavelength plate for converting said parallel light beam rays into a circularly polarized light beam;

(e) an objective lens that receives said circularly polarized light beam and focuses it into a light spot that impinges upon an optical disk, said light spot being reflected back towards said objective lens such that said reflected light spot is converted by said objective lens into a reflected circularly polarized light beam that rotates in a direction different from said circularly polarized light beam that was emitted by said quarter wavelength plate, said reflected circularly polarized light beam being converted into a reflected linearly polarized light beam as it re-enters said quarter wavelength plate heading back towards said light beam creating means, said reflected linearly polarized light beam being diverted by said beam splitter;

(f) a condenser lens that receives said light beam diverted by said beam splitter and focuses it upon a light receiving element; and (g) a light refracting member that is disposed between said condenser lens and said light receiving element for intercepting a portion of said light beam that exits said condenser lens so as to converge said light beam onto a first light receiving area of said light receiving element for detecting tracking errors in said optical system, said light beam that is not intercepted by said light refracting member being converged upon a second light receiving area of said light refracting element for detecting focusing errors in said optical system.

10. The optical pickup of claim 9, wherein said light refracting member comprises a wedge shaped prism.

11. The optical pickup of claim 9, wherein said first light receiving area comprises two light receiving portions and said second light receiving area comprises two light receiving portions.

12. The optical pickup of claim 9, wherein said light refracting member comprises a parallel plane plate.

13. The optical pickup of claim 10, wherein said wedge shaped prism is positioned between said condenser lens and said light receiving element such that an incident face of said prism is positioned substantially normal to the optical axis of said light beam while an outgoing face of said prism is slanted by a predetermined angle with respect to said incident face so that it functions as a knife edge to converge said light beam onto said first light receiving area of said light receiving element.

14. The optical pickup of claim 11, wherein said first light receiving area is positioned substantially perpendicularly to said second light receiving area.

15. The optical pickup of claim 14, wherein said light refracting member comprises a wedge shaped prism.

16. The optical pickup of claim 15, wherein said wedge shaped prism is positioned between said condenser lens and said light receiving element such that an incident face of said prism is positioned substantially normal to the optical axis of said light beam while an outgoing face of said prism is slanted by a predetermined angle with respect to said incident face so that it functions as a knife edge to converge said light beam onto said first light receiving area of said light receiving element.

17. The optical pickup of claim 12, wherein said parallel plane plate is disposed between said condenser lens and said light receiving element such that a ridge line of said parallel plane plate intercepts a portion of said light beam so as to change the optical path of said intercepted light beam portion to converge said intercepted portion of said light beam onto said first light receiving area of said light receiving element.

18. The optical pickup of claim 12, wherein said first light receiving area comprises two light receiving portions and said second light receiving area comprises two light receiving portions.

19. The optical pickup of claim 18, wherein said first light receiving area is positioned substantially perpendicularly to said second light receiving area.

20. An optical pickup for an optical system, comprising:
(a) an objective lens for receiving a light source and forming a spot on an optical disk;
(b) means for diverting said reflected light beam that is reflected from said optical disk;
(c) a condenser lens for converging said reflected light beams that are diverted by said diverting means;
(d) a light refracting member for permitting a portion of said light beam coming from said condenser lens to enter therein, refracting said portion of said light beam so as to separate it from the remaining portion of said light beam which is not permitted to enter said light refracting member;
(e) a first light receiving portion that receives said light beam that passes through said light refracting member for detecting tracking errors in said optical system; and
(f) a second light receiving portion that receives said light beam which does not enter said light refracting member for detecting focussing errors in said optical system.

21. The optical pickup of claim 20, wherein said diverting means comprises a beam splitter.

22. The optical pickup of claim 20, wherein said light refracting member comprises a parallel plane plate that is disposed at an angle with respect to a plane that is substantially perpendicular to an optical axis of said light beam.

23. The optical pickup of claim 20, wherein said light refracting member comprises a wedge-shaped prism.

24. The optical pickup of claim 20, wherein said light receiving portion for detecting tracking errors and said light receiving portion for detecting focussing errors are each provided with a pair of light receiving areas, said light receiving portion for detecting tracking errors being positioned substantially perpendicular to said light receiving portion for detecting focussing errors.

25. The optical pickup of claim 22, wherein said light receiving portion for detecting tracking errors and said light receiving portion for detecting focussing errors are each provided with a pair of light receiving areas, said light receiving portion for detecting tracking errors being positioned substantially perpendicular to said light receiving area of said light receiving portion for detecting focussing errors.

26. The optical pickup of claim 23, wherein said light receiving portion for detecting tracking errors and said light receiving portion for detecting focussing errors are each provided with a pair of light receiving areas, said light receiving portion for detecting tracking errors being positioned substantially perpendicular to said light receiving area of said light receiving portion for detecting focussing errors.

27. The optical pickup of claim 24, wherein said light receiving portions for detecting tracking errors and focusing errors are positioned in a single housing.

28. An optical pickup for an optical system, comprising:
(a) an objective lens for receiving a light source and forming a spot on an optical disk;
(b) a beam splitter for diverting a portion of said reflected light beam that is reflected from said optical disk;
(c) a condenser lens for converging said reflected light beams that are diverted by said diverting means;
(d) a light refracting member for permitting a portion of said light beam coming from said condenser lens to enter therein, refracting said portion of said light beam so as to separate it from the remaining portion of said light beam which is not permitted to enter said light refracting member;
(e) a first light receiving portion that receives said light beam that passes through said light refracting member for detecting tracking errors in said optical system; and
(f) a second light receiving portion that receives said light beam which does not enter said light refracting member for detecting focussing errors in said optical system.

29. The optical pickup of claim 28, wherein said light refracting member comprises a parallel plane plate that is disposed at an angle with respect to a plane that is substantially perpendicular to an optical axis of said light beam.

30. The optical pickup of claim 28, wherein said light refracting member comprises a wedge-shaped prism.

31. The optical pickup of claim 28, wherein said light receiving portion for detecting tracking errors and said light receiving portion for detecting focussing errors are each provided with a pair of light receiving areas, said light receiving portion for detecting tracking errors being positioned substantially perpendicular to said light receiving portion for detecting focussing errors.

32. The optical pickup of claim 30, wherein said light receiving portion for detecting tracking errors and said light receiving portion for detecting focussing errors are each provided with a pair of light receiving areas, said light receiving portion for detecting tracking errors being positioned substantially perpendicular to said light receiving area of said light receiving portion for detecting focussing errors.

33. The optical pickup of claim 29, wherein said light receiving portion for detecting tracking errors and said light receiving portion for detecting focussing errors are each provided with a pair of light receiving areas, said light receiving portion for detecting tracking errors being positioned substantially perpendicular to said light receiving area of said light receiving portion for detecting focussing errors.

* * * * *